March 31, 1936. W. H. CALDWELL 2,036,018
TURBINE
Filed May 2, 1934
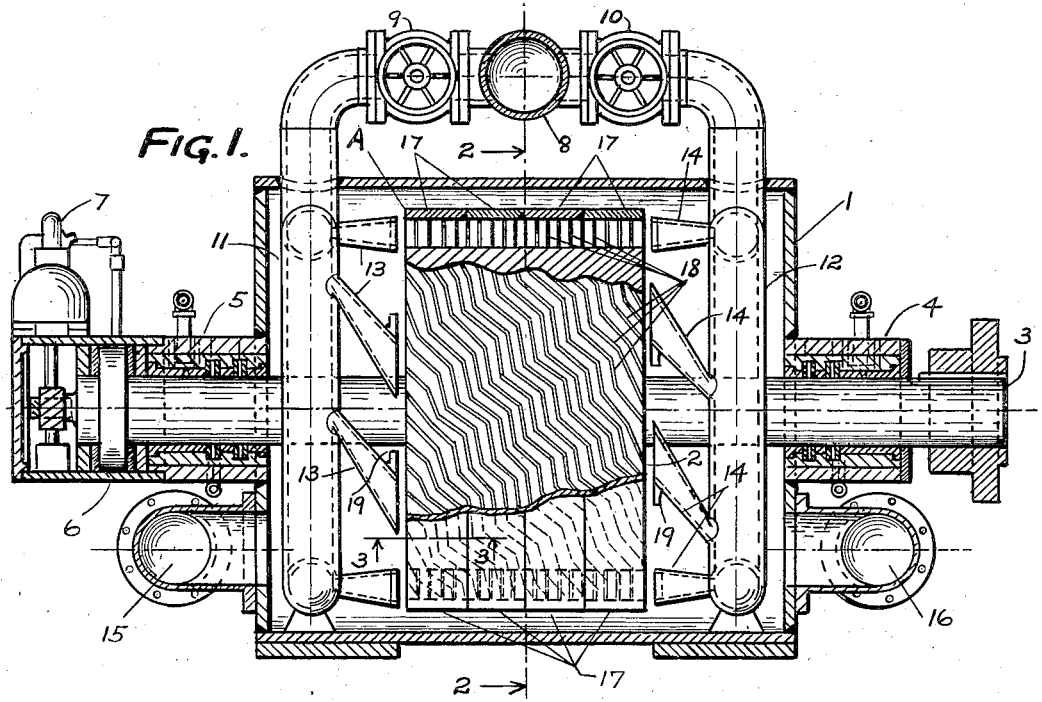
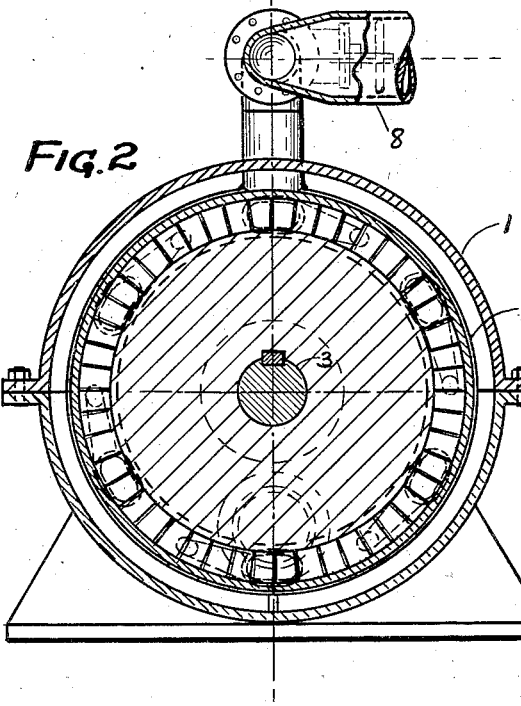
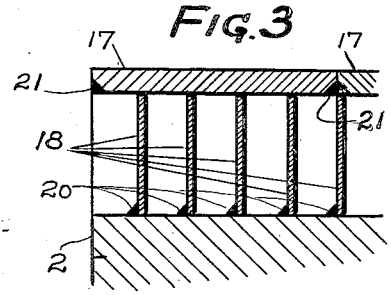
INVENTOR
William Hart Caldwell Patented Mar. 31, 1936

2,036,018

UNITED STATES PATENT OFFICE 2,036,018

TURBINE

William Hart Caldwell, Ballston Lake, N. Y.

Application May 2, 1934, Serial No. 723,535

9 Claims. (Cl. 253—73)

The present invention relates to turbines which are driven by steam, gas, mercury vapor or any suitable fluid and it mostly resembles steam turbines although it is not limited to turbines driven by steam.

Regarding such turbines, it is desirable to provide a turbine which will be simple in construction, which does not require close clearance between rotor wheel and casing, which can be run at a slow speed, when such a design is necessary, and not lose economy of working fluid. Also to provide a turbine which will run equally well in either direction—in other words a turbine which is reversible.

The turbines with which I am familiar are not simple in construction, they require very careful fabrication and balancing due to the high speeds they must attain for economical running, and for economy of driving fluid they require close clearances between the moving and fixed blades and the casing.

Furthermore, they are not suited for low speed operation such as the direct drive of a propeller shaft on a moderate speed ship. To attain economy on a drive to a power station dynamo for example, turbines have to run at very high and often dangerous speeds which increases their cost of manufacture.

None of the turbines with which I am familiar are capable of being reversed and when they are required to be reversed, such as on a ship, a separate turbine must be added which cannot be used except when the ship is going astern, and no turbines I am familiar with are in themselves free from dangerous overspeeding when the various governing devices fail to act, and all of the turbines at present in use are open to the danger of liquid coming over with the vapor from the boilers and causing the blading to be stripped thus requiring an expensive shutdown for repairs.

The object of my present invention is to provide an improved turbine which is simple in construction and not expensive to manufacture, which requires no very accurate fabrication since it is not affected by the question of close clearances between rotor wheel and casing, and does not have to be carefully balanced since its working speed need not be high to attain economy of driving fluid and even at high speed it is not affected by close clearance, since the clearance between the rotor wheel and the casing may be large enough to eliminate all question of rubbing.

A further object of my invention is to provide a turbine which is capable of being designed and made to run at practically any required speed and still be economical, which can be designed and made to be self-protecting against overspeed in case governors fail to act, which can be so designed and made that its driving elements are not likely to be damaged by liquid coming over with the driving vapor, and which can be made to run equally well in either direction in other words, a turbine which is reversible.

For a consideration of what I believe to be novel and useful and my invention, attention is directed to the accompanying description and the claims appended thereto.

In the drawing, Fig. 1 is a longitudinal sectional elevation of a reversible steam turbine embodying my invention, and Fig. 2 is a cross sectional end elevation taken on line 2—2 of Fig. 1. Fig. 3 is an enlarged detail of the top left hand corner of the rotor wheel marked with the letter "A" in Fig. 1, and it represents also a section of the rotor wheel rim taken on line 3—3 also in Fig. 1.

Referring to the drawing, 1 indicates a turbine casing in which is located a rotor wheel 2, this rotor wheel is shown in Fig. 1 with its rim in cross section, and for the sake of clearness the middle portion shows the driving elements in outside view with the rim removed, and the lower portion shows the rim itself in outside view. 3 is a shaft which supports the rotor wheel and 4 and 5 are bearings for this shaft, 6 is a thrust block, 7 is a governor, 8 is the main steam inlet, 9 is the steady "ahead" running valve which regulates the steam to the ring header 11 on which are placed six nozzles each numbered 13 and these convey steam to the driving elements which are bent plates numbered 18 and which form the walls of winding passages attached spirally along the outer face of rotor wheel 2 and these passages are covered over with rim plates 17. The steam moves along the spiral passages and impinges on the deflecting surfaces of the bent plates 18 and gives up energy, finally being exhausted to the casing and from there to the exhaust opening 16 which may lead to a condenser or any other device, the valve 10 being of course closed when valve 9 is open. 10 is the reverse running "astern" valve and conveys steam to the ring header 12 on which are placed six nozzles each numbered 14 and these convey steam to driving elements 18 and when valve 9 is closed this steam reverses the rotation of wheel 2, then it exhausts to casing 1, from there the steam exhausts to opening 15 and then it may go to a condenser or other device. Referring further to Fig. 1, 19 is a baffle plate attached to nozzles 13 and 14, these baffles may be designed to interfere with the exhaust steam at certain calculated speeds and so prevent speeding up of the rotor wheel to an overspeed which may be dangerous.

Fig. 3 shows the method of attaching the driving elements to the rotor wheel, the bent plates 18 are shown, in this case, welded to the rotor by welds 20, and the rims 17 are welded to the bent plates 18 by the welds 21 where the rims pass over the spiral driving elements 18 and are welded along the edge. Welding in the case is shown because it is most convenient and the latest method but of course these elements may be attached in any other suitable manner.

From a structural standpoint my invention possesses great advantages because it can be economically made and the art of welding can be used freely in many of its parts, and it can also be very easily repaired without being sent to a machine shop, it can be repaired on a ship at sea.

There are no close clearances and no accuracy is required beyond ordinary mechanical workmanship, the whole design can be rugged and simple, all of which will reduce cost and supply a turbine which is not liable to breakdown.

Furthermore it will be noted that the design of this turbine can be varied to give a slow speed or a high speed machine by varying the number and angle of the driving elements 18, also the number of deflecting surfaces, the width of rotor and length of spiral passages, all of which may be calculated and so shaped as to give any practical speed without undue loss of economy.

Another purpose of my invention is to provide a turbine which will not have the disadvantage of the single stage impulse turbine in being required to run at very high speed to get economy, and which does not have the disadvantage of the multi-stage reaction turbine in losing economy at low speeds and also being subject to friction losses between stages. My invention it will be noted is not so subject to friction losses because all the frictional contact along the driving elements is being used to drive the rotor wheel and the steam or vapor has no contact during its work cycle with the turbine casing.

The essential part of my invention is contained in the driving elements located in the outer portion of the rotor wheel and in the combination of these elements with the tapered diverging expanding nozzles which direct the steam or vapor so that it impinges upon the surfaces of the driving elements thereby causing the fluid to be deflected from a straight line path and consequently being forced to give up its energy of translation to that of energy of rotation on the rotor wheel.

I am aware that expanding nozzles have been used in both impulse and reaction turbines heretofore and in conjunction with short bladed passages in wheel rims and also with a multiplicity of these wheel rims interrupted with reaction blading fixed to the casing and not moving with the rotor wheel, but I am not aware that such nozzles have ever been used to direct steam or vapor into long winding passages not interrupted by fixed blades which are not a part of the rotor wheel but which are a part of the casing or fixed thereto.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The combination in turbines of a shaft with rotor wheel fixed thereon, a casing with bearings surrounding both, means to direct and expand a driving fluid to either end of rotor wheel, a multiplicity of passages contained in outer portion of rotor wheel, each of said passages open at both ends with four continuous sides, two of which are parallel cylindrical surfaces, one inside the other and not diverging or forming a tapered passage, the other two being also parallel surfaces which form a spiral or helical path around the rotor and being angled back and forth along the path to present constantly pitched deflecting surfaces to deflect the driving fluid from right to left without any abrupt right angle obstructions to its flow, and the deflecting surfaces being equal in size and shape from end to end of the path so that the driving fluid may be entered at one end of the path or the other with equal efficiency and thereby cause the rotor to revolve in either direction.

2. The combination in turbines of a shaft with rotor wheel fixed thereon, a casing with bearings surrounding both, means to convey and expand and direct the driving fluid to outer portion of rotor wheel, a multiplicity of passages contained in outer portion of rotor wheel, each of said passages being open at both ends and the line of general direction of each passage traversing the peripheral face of the rotor in a spiral or helical curve, two sides of any one of these passages being formed by the peripheral face of the rotor for one and a cylindrical ring or rim for the other, the two remaining sides being formed by elements which project from and are fixed to the rotor and to the rim, said elements being similar in form and of equal and constant thickness and being waved back and forth in the general spiral direction to offer angled deflecting surfaces of similar shape and pitch from one end of the rotor to the other, said pitch not increasing or decreasing and no single deflecting surface being exceptionally shaped to cause a change in the general direction of the spiral path followed by all the other deflecting surfaces.

3. The combination of a shaft, rotor, and casing, means to direct driving fluid to elements in rotor, said elements being projections from rotor to a rim which covers them and forms a number of winding passages which extend angularly along outer part of rotor, said passages open at each end, and the walls of same which project from rotor to rim being continuous and angled and curved to offer a multiplicity of obstructions to the flow of the driving fluid these obstructions being at less than right angles to the flow of the fluid, and being equally pitched around the periphery of the rotor and equidistant from each other and of equal thickness, and each projecting the same distance from the rotor, and forming paths which are continuous in direction and equal in cross-sectional area from end to end.

4. The combination of a shaft, rotor and casing, with means to convey driving fluid to one or more tapered diverging expanding nozzles situated at each end of the rotor, said nozzles to project driving fluid into winding passages along rim of rotor, these passages having a multiplicity of bends besides being bent around the rotor and each nozzle having a projecting plate or baffle at its mouth, said baffle plate to obstruct flow of exhaust fluid at certain overspeed and slow down rotor to prevent damage.

5. The combination of a shaft with rotor wheel and a casing, nozzles at each end of the rotor to direct steam or vapor to outer part of rotor wheel and into any number of passages within said rotor wheel, these passages each having four walls, top and bottom walls being part of cylinders formed by the rotor and the rim which covers the passages, the side walls being composed of projections on rotor and extending along surface of same in a spiral direction and being continuous from one end of rotor to the other and the said side walls having a number of bends which act as baffles to the steam or vapor and deflect said steam or vapor from its straight line path and thereby derive energy from same and each nozzle having a projecting plate or baffle at its mouth, said baffle plate to obstruct flow of exhaust fluid at certain overspeed and slow down the rotor to prevent damage.

6. The combination of a shaft, rotor wheel and casing, nozzles to direct working fluid to outer part of rotor and project same into openings in both ends of rotor wheel, said openings extending through rotor and along peripheral region under a cylindrical rim and forming passages at any angle to the center line of turbine shaft, said passages curving round the rotor in a winding path whose general direction is a spiral curve or any convenient curve, and said passages deviating from that curve in a plane cylindrical to the shaft axis so as to form more than one deflecting surface against which the driving fluid impinges and each nozzle having a projecting plate or baffle at its mouth, said baffle plate to obstruct flow of exhaust fluid at certain overspeed and slow down the rotor to prevent damage.

7. The combination of a shaft, rotor wheel and a casing, together with means to convey steam or any vapor or gas to one or more nozzles which guide said gases into a multiplicity of openings at both ends of the rotor wheel, said openings being formed by blades which are welded to rotor and covered by one or more rims and welded thereto, and said blades having a multiplicity of bends besides being bent round peripheral region of rotor in a general angular direction which may develop any required curve, said multiplicity of bends being lateral to this general curve and presenting a multiplicity of obstructing surfaces to retard flow of driving fluid along passage and obtain energy and each nozzle having a projecting plate or baffle at its mouth, said baffle plate to obstruct flow of exhaust fluid at certain overspeed and slow down the rotor to prevent damage.

8. The combination of a shaft, rotor wheel, and a casing, together with means to convey steam or any vapor or gas to one or more nozzles situated at both ends of rotor wheel, said nozzles to guide vapor or gas into openings which are winding passages along peripheral region of rotor, said winding passages having more than one turn and offering more than one surface for the driving fluid to strike against and being open at both ends so that nozzles may be used to project steam or vapor or gas into any one of two ends and reverse the rotation of the rotor to any direction required during operation and each nozzle having a projecting plate or baffle at its mouth, said baffle plate to obstruct flow of exhaust fluid at certain overspeed and slow down the rotor to prevent damage.

9. The combination of a rotor and casing, a source of driving fluid, nozzles supported by the casing at each end of the rotor, means for supplying driving fluid to the nozzles at one end of the rotor for driving it in one direction and to the nozzles at the other end of the rotor for driving it in the other direction, driving elements on the rotor adjacent said nozzles and a baffle plate at the mouth of each nozzle for obstructing the flow of exhausting fluid when the rotor overspeeds.

WILLIAM HART CALDWELL.